United States Patent
Mackrory et al.

(10) Patent No.: US 6,732,294 B2
(45) Date of Patent: May 4, 2004

(54) METHOD OF DISASTER RECOVERY TESTING AND STORAGE SYSTEM

(75) Inventors: Mitchell Mackrory, Longmont, CO (US); Tally Steven O'Donnell, Boulder, CO (US); Ralf Hunold, Schwerte (DE)

(73) Assignee: Storage Technology Corporation, Louisville, CO (US)

(*) Notice: Subject to any disclaimer, the term of this patent is extended or adjusted under 35 U.S.C. 154(b) by 272 days.

(21) Appl. No.: 10/034,705

(22) Filed: Dec. 27, 2001

(65) Prior Publication Data

US 2003/0126389 A1 Jul. 3, 2003

(51) Int. Cl.[7] ............................................. G06F 12/16
(52) U.S. Cl. ........................ 714/25; 714/37; 711/162; 707/202
(58) Field of Search .................... 714/30, 31, 32, 714/33, 37–38, 41, 25; 711/162; 707/202, 204

(56) References Cited

U.S. PATENT DOCUMENTS

| | | | | |
|---|---|---|---|---|
| 5,889,935 A | * | 3/1999 | Ofek et al. .................... 714/6 |
| 6,304,980 B1 | * | 10/2001 | Beardsley et al. ............. 714/6 |
| 6,442,709 B1 | * | 8/2002 | Beal et al. .................... 714/33 |
| 6,446,175 B1 | * | 9/2002 | West et al. .................. 711/162 |
| 6,499,112 B1 | * | 12/2002 | Milillo et al. ................. 714/6 |
| 2002/0049778 A1 | * | 4/2002 | Bell et al. ................... 707/200 |
| 2002/0053009 A1 | * | 5/2002 | Selkirk et al. .............. 711/162 |
| 2003/0126388 A1 | * | 7/2003 | Yamagami ................. 711/162 |

* cited by examiner

Primary Examiner—Hong Kim
(74) Attorney, Agent, or Firm—Brooks Kushman P.C.

(57) ABSTRACT

A method of disaster recovery testing continues to maintain a data collection and it continues to maintain a backup data collection. The method includes creating a disaster recovery control file based on a standard control file. An instance of the backup data collection is protected. A standard output pool is established for recording changes to the backup data collection occurring under control of the standard control file. A disaster recovery output pool is established for recording changes to the backup data collection occurring under control of the disaster recovery control file. Disaster recovery testing is conducted under control of the disaster recovery control file.

10 Claims, 3 Drawing Sheets

METHOD OF DISASTER RECOVERY TESTING AND STORAGE SYSTEM

BACKGROUND OF THE INVENTION

1. Field of the Invention

The present invention relates to storage systems of the type including tape cartridge storage facilities and associated virtual tape subsystems, and to methods of disaster recovery testing.

2. Background Art

A virtual storage system includes a tape cartridge storage facility accessible from a host through a virtual tape subsystem. Some virtual storage systems employ a second tape cartridge storage facility that maintains a backup data collection of the data collection at the first tape cartridge storage facility. Typically, the backup system is transparent to the user at the host, as is the virtual tape subsystem. The virtual tape subsystem is a system that emulates tapes and allows better utilization of tape volumes by providing virtual tape volumes and virtual tape drives. That is, the use of the virtual tape subsystem allows multiple tape volumes to be stored on a single tape cartridge at the storage facility.

Current implementations of tape cartridge storage facilities and associated virtual tape subsystems provide data redundancy to allow disaster recovery in the event of a disaster. Disaster recovery testing is conducted by simulating a disaster and then attempting to recover data. Currently, there is a demand for a significantly higher level of data availability for disaster recovery testing of the tape subsystems. Specifically, there is a need for production data to be available for disaster recovery testing while being currently available to production facilities within the same enclosed virtual environment. To meet this need requires concurrent access to the same data by two or more systems (production and disaster recovery systems), ability to modify data while preserving both the old and new copies of the data, and ability to use the same system facility identification on two or more systems.

For the foregoing reasons, there is a need for a method of disaster recovery testing with the backup data collection while continuing to maintain the production data collection and to maintain the backup data collection during testing.

SUMMARY OF THE INVENTION

It is, therefore, an object of the present invention to provide a method of disaster recovery testing with the backup data collection while continuing to maintain the production data collection and to maintain the backup data collection during testing.

In carrying out the above object, a method of disaster recovery testing is provided. The method is for use with a storage system including a first tape cartridge storage facility, a second tape cartridge storage facility, and a virtual tape subsystem. A standard control file contains information for managing the storage system. The first tape cartridge storage facility maintains a data collection. The second tape cartridge storage facility maintains a backup data collection. The method of disaster recovery testing with the backup data collection at the second tape cartridge storage facility while continuing to maintain the data collection and to maintain the backup data collection comprises creating a disaster recovery control file based on the standard control file. The method further comprises protecting an instance of the backup data collection, establishing a standard output pool, and establishing a disaster recovery output pool. The standard output pool is for recording changes to the backup data collection occurring under control of the standard control file after protecting the instance. The disaster recovery output pool is for recording changes to the backup data collection occurring under control of the disaster recovery control file after protecting the instance. The method further comprises conducting the disaster recovery testing under the control of the disaster recovery control file.

The method may further comprise reserving a portion of the virtual tape subsystem for exclusive use under control of the disaster recovery control file. The method may further comprise, after conducting the disaster recovery testing, terminating the disaster recovery testing. Thereafter, the protected instance of the backup data collection is unprotected and the portion of the virtual tape subsystem is unreserved. Preferably, the standard output pool and the disaster recovery output pool are at the second tape cartridge storage facility.

Further, in carrying out the present invention, a storage system is provided. The storage system includes a first tape cartridge storage facility, a second tape cartridge storage facility, and virtual tape subsystem. A standard control file contains information for managing the storage system. The first tape cartridge storage facility maintains a data collection, and the second tape cartridge storage facility maintains a backup data collection. The storage system further includes control logic executable to perform a method of disaster recovery testing with the backup data collection at the second tape cartridge storage facility while continuing to maintain the data collection and to maintain the backup data collection. The control logic is programmed to create a disaster recovery control file based on the standard control file. The control logic is further programmed to protect an instance of the backup data collection, establish a standard output pool, and establish a disaster recovery output pool. The standard output pool is for recording changes to the backup data collection occurring under control of the standard control file after protecting the instance. The disaster recovery output pool is for recording changes to the backup data collection occurring under control of the disaster recovery control file after protecting the instance. The control logic is further programmed to conduct the disaster recovery testing under control of the disaster recovery control file.

The system control logic may be further programmed to reserve a portion of the virtual tape subsystem for exclusive use under control of the disaster recovery control file. The control logic may further be programmed to, after testing, terminate the disaster recovery test, unprotect the protected instance of the backup data collection, and unreserve the portion of the virtual tape subsystem. In a preferred system, the standard output pool and the disaster recovery output pool are at the second tape cartridge storage facility.

The advantages associated with embodiments of the present are numerous. For example, embodiments of the present invention provide disaster recovery testing with the backup data collection at the second tape cartridge storage facility while continuing to maintain the data collection and to maintain the backup data collection by utilizing a disaster recovery control file, a backup instance, and separate output pools.

The above object and other objects, features, and advantages of the present invention are readily apparent from the following detailed description of the preferred embodiment when taken in connection with the accompanying drawings.

DETAILED DESCRIPTION OF THE PREFERRED EMBODIMENTS

Figure 1:
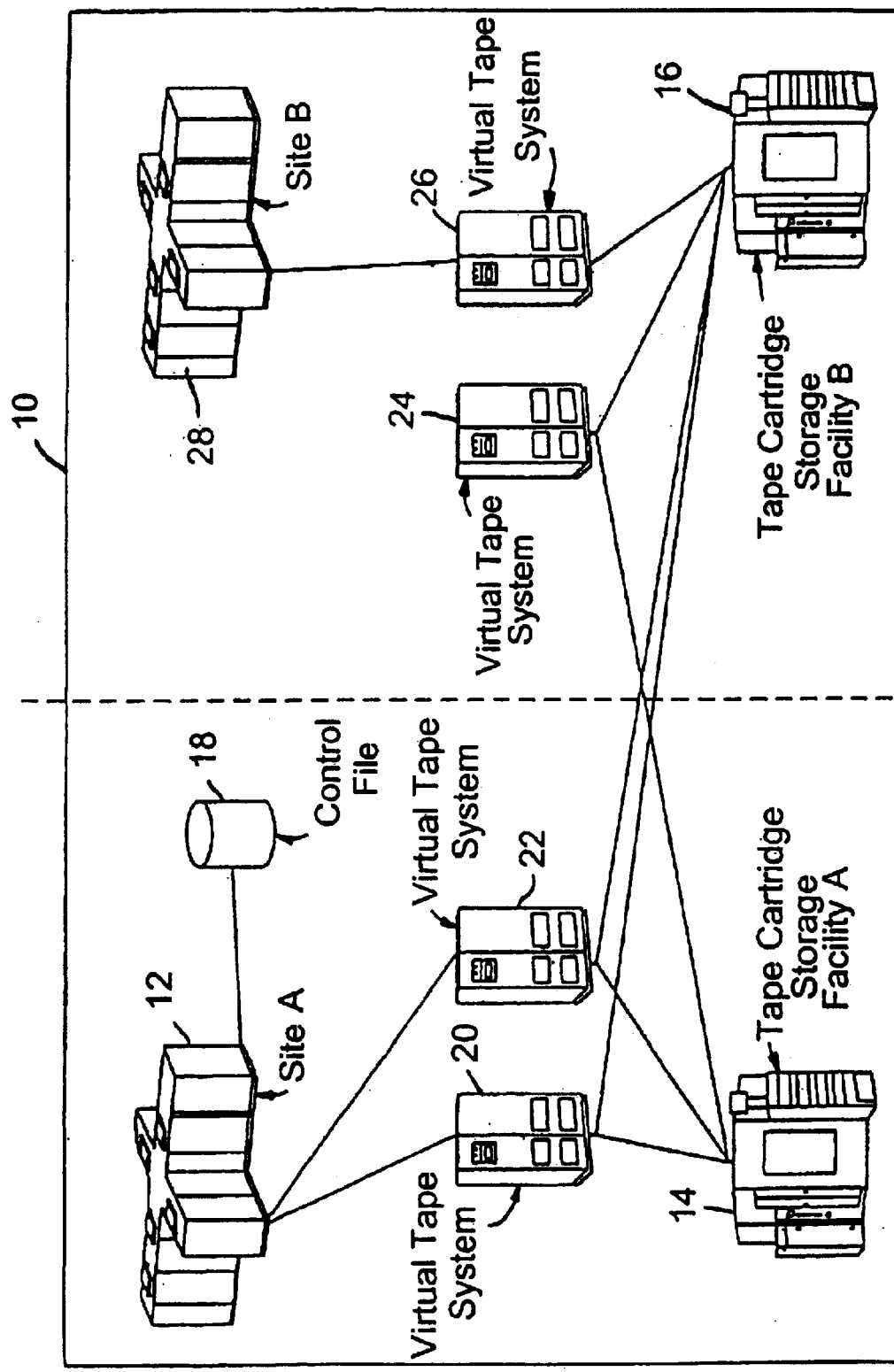
FIG. 1 illustrates a storage system in a normal configuration.

FIG. 1 illustrates a storage system 10 in a normal production configuration. Storage system 10 includes first site 12 which includes a host software component. Site 12 stores data in first and second tape cartridge storage facilities 14 and 16, respectively. First facility 14 includes the entire data collection while second facility 16 includes a backup copy of the entire data collection. The host software component at site 12 executes control logic and utilizes a control file 18 to manage storage system 10. Control file 18 includes information about all aspects of storage system 10 and may be stored on a local drive at site 12. To provide more efficient storage at facilities 14 and 16 and other advantages, a virtual tape subsystem is located between site 12 and storage facilities 14 and 16. It is appreciated that the virtual tape subsystem may cooperate with site 12 and facilities 14 and 16 in many ways and the illustrated cooperation is exemplary. As shown, the virtual tape subsystem includes virtual tape systems 20, 22, 24, and 26. Preferably, in normal production operation, servers 20 and 22 cooperate to perform all recalling of data from facility 14 as well as all communicating with site 12. Servers 24 and 26 cooperate to provide all data migration and in normal operation receive data from servers 20 and 22.

Also shown in FIG. 1 is second site 28. Site 28 is the disaster recovery site where disaster recovery testing occurs. In the storage system of FIG. 1, embodiments of the present invention allow production data to be available to production facilities at site 12 while being concurrently available to disaster recovery at site 28. In making production data available to both production facilities and disaster recovery facilities, embodiments of the present invention allow access to the same data by two or more systems, allow current use of the same facility identification by two or more systems, and allow data to be modified by production facilities while preserving both the old and new copies of the data as best understood with reference to FIG. 2.

Figure 2:
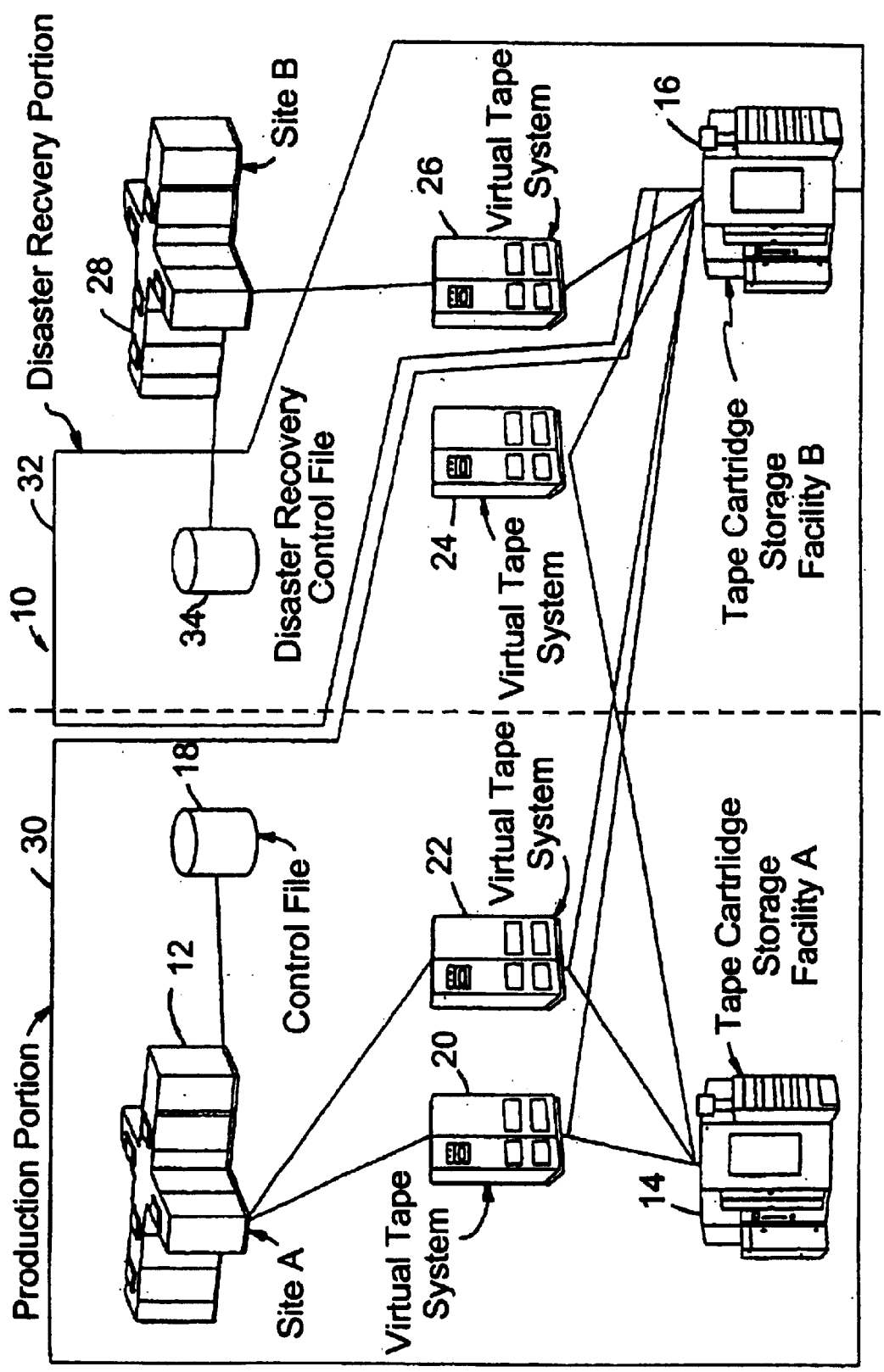
FIG. 2 illustrates a storage system in a disaster recovery configuration in accordance with the present invention.

In FIG. 2, like parts are given like reference numbers. Storage system 10, upon initiation of disaster recovery testing, is partitioned into production portion 30 and disaster recovery portion 32. Specifically, disaster recovery control file 34 is created based on standard control file 18. Accordingly, control logic executed at site 12 utilizes standard control file 18 to maintain the production data collection while control logic at site 28 utilizes disaster recovery control file 34 to maintain the backup data collection.

In accordance with the present invention, facility 14 stays on production side 30 of system 10 while facility 16 is shared by production side 30 and testing side 32 of system 10. As shown, virtual tape servers 20, 22, and 24 are used on the production side 30 while virtual tape server 26 is used on the disaster recovery testing side 32 of system 10. As mentioned previously, it is appreciated that the virtual tape subsystems may be implemented in a variety of ways and division of these facilities may vary depending on the implementation.

Figure 3:
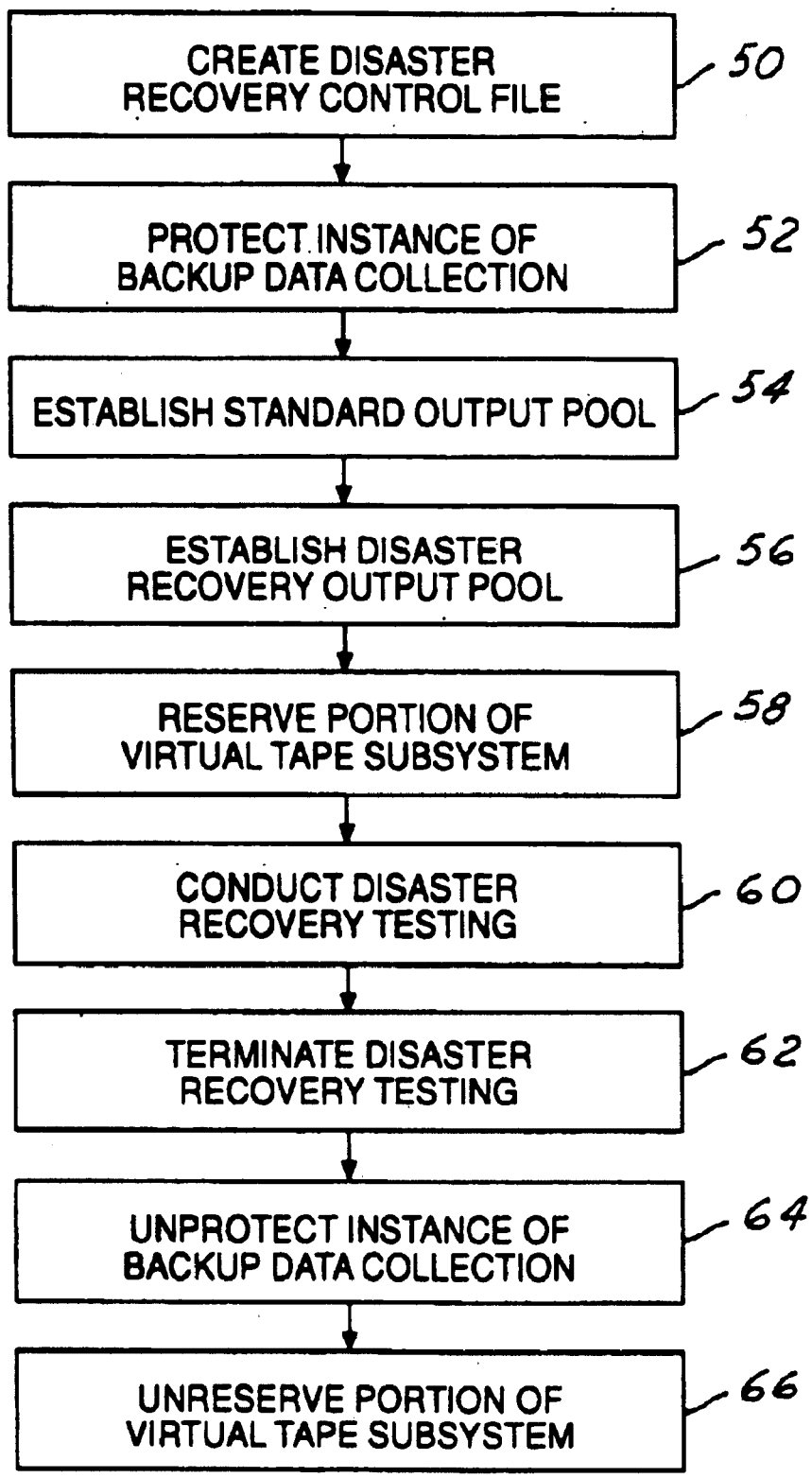
FIG. 3 illustrates a preferred method of the present invention.

Referring to FIGS. 2 and 3, disaster recovery control file 34 is created based on standard control file 18 (block 50). The current instance of the backup data collection at second tape cartridge storage facility 16 is protected (block 52). This is achieved by freezing the data using pointers to virtual tape volumes to preserve data for use by production and disaster recovery. At facility 16, a standard output pool for recording changes to the backup data collection occurring under control of standard control file 18 is established (block 54). A disaster recovery output pool for recording changes to the backup data collection occurring under control of disaster recovery control file 34 is established (block 56). A portion of the virtual tape subsystem (server 26) is reserved (block 58). Disaster recovery testing under the control of disaster recovery control file 34 is conducted (block 60). Upon completion of disaster recovery testing, disaster recovery testing is terminated, the backup data collection instance is then unprotected, and any reserve portion of the virtual tape subsystem is unreserved or freed (block 62, 64, and 66). Several details of preferred embodiments are further described below.

Specifically, in accordance with preferred embodiments of the present invention, pointers in the control files are used to freeze existing tape data placement. Once these pointers have been frozen to protect the instance of the backup data collection, two or more systems are allowed to access the frozen data as read only. Changes in the data from any individual system are handled by creating the changes in a separate output pool. This is a form of log structured data placement. The disaster recovery output pool or parts of it may be kept after testing for later analysis.

It is appreciated that the control files may take many forms and a suitable control file includes such information as system configuration, physical configuration, and virtual configuration information. The system configuration information includes physical hardware layout and system software information. The physical configuration includes physical cartridge details. The virtual configuration includes all virtual details.

In a preferred implementation of protecting the instance of the backup data collection, frozen multi-volume cartridges (at facility 16) for disaster recovery are marked as read only to all systems. In addition, the virtual tape subsystem may be partitioned between the production and disaster recovery sides of the storage system with the different sides being offline to each other. Further, enhanced features of facilities 14 and 16 may be temporarily disabled.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. For use with a storage system including a first tape cartridge storage facility, a second tape cartridge storage facility, and a virtual tape subsystem, wherein a standard control file contains information for managing the storage system, and wherein the first tape cartridge storage facility maintains a data collection, and the second tape cartridge storage facility maintains a backup data collection, a method of disaster recovery testing with the backup data collection at the second tape cartridge storage facility while continuing to maintain the data collection and to maintain the backup data collection, the method comprising:

creating a disaster recovery control file based on the standard control file;

protecting an instance of the backup data collection;

establishing a standard output pool for recording changes to the backup data collection occurring under control of the standard control file after protecting the instance;

establishing a disaster recovery output pool for recording changes to the backup data collection occurring under control of the disaster recovery control file after protecting the instance; and conducting the disaster recovery testing under control of the disaster recovery control file.

2. The method of claim 1 further comprising:

terminating the disaster recovery testing; and unprotecting the protected instance of the backup data collection.

3. The method of claim 1 further comprising:

reserving a portion of the virtual tape subsystem for exclusive use under control of the disaster recovery control file.

4. The method of claim 3 further comprising:

terminating the disaster recovery testing;

unprotecting the protected instance of the backup data collection; and unreserving the portion of the virtual tape subsystem.

5. The method of claim 1 wherein the standard output pool and the disaster recovery output pool are at the second tape cartridge storage facility.

6. A storage system including a first tape cartridge storage facility, a second tape cartridge storage facility, and a virtual tape subsystem, wherein a standard control file contains information for managing the storage system, and wherein the first tape cartridge storage facility maintains a data collection, and the second tape cartridge storage facility maintains a backup data collection, the storage system further including control logic executable to perform a method of disaster recovery testing with the backup data collection at the second tape cartridge storage facility while continuing to maintain the data collection and to maintain the backup data collection, the control logic being programmed to:

create a disaster recovery control file based on the standard control file;

protect an instance of the backup data collection;

establish a standard output pool for recording changes to the backup data collection occurring under control of the standard control file after protecting the instance;

establish a disaster recovery output pool for recording changes to the backup data collection occurring under control of the disaster recovery control file after protecting the instance; and conduct the disaster recovery testing under control of the disaster recovery control file.

7. The system of claim 6 wherein the control logic is further programmed to:

terminate the disaster recovery testing; and unprotect the protected instance of the backup data collection.

8. The system of claim 6 wherein the control logic is further programmed to:

reserve a portion of the virtual tape subsystem for exclusive use under control of the disaster recovery control file.

9. The system of claim 8 wherein the control logic is further programmed to:

terminate the disaster recovery testing;

unprotect the protected instance of the backup data collection; and unreserve the portion of the virtual tape subsystem.

10. The system of claim 6 wherein the standard output pool and the disaster recovery output pool are at the second tape cartridge storage facility.

* * * * *